United States Patent [19]

Hunke

[11] Patent Number: 5,474,435
[45] Date of Patent: Dec. 12, 1995

[54] DEVICE FOR COOLING, GRANULATING AND DRYING MOLTEN STRANDS OF SYNTHETIC THERMOPLASTIC MATERIAL EMERGING FROM DIES

[75] Inventor: Friedrich Hunke, Grossostheim, Germany

[73] Assignee: Rieter Automatik GmbH, Germany

[21] Appl. No.: 150,050

[22] PCT Filed: Mar. 16, 1993

[86] PCT No.: PCT/EP93/00604

§ 371 Date: Nov. 18, 1993

§ 102(e) Date: Nov. 18, 1993

[87] PCT Pub. No.: WO93/18901

PCT Pub. Date: Sep. 30, 1993

[30] Foreign Application Priority Data

Mar. 23, 1992 [DE] Germany .................. 42 09 373.2

[51] Int. Cl.[6] ................ B29B 9/06; B29C 47/88
[52] U.S. Cl. ............... 425/71; 264/143; 264/145; 425/308; 425/DIG. 230
[58] Field of Search ............. 425/71, 311, 308, 425/315, DIG. 230; 264/142, 143, 145

[56] References Cited

U.S. PATENT DOCUMENTS

| | | | |
|---|---|---|---|
| 2,539,916 | 1/1951 | Ludington et al. | 425/311 |
| 2,975,483 | 3/1961 | Cooper et al. | 264/142 |
| 3,207,818 | 9/1965 | Marshall | 264/142 |
| 4,025,252 | 5/1977 | Hunke | 425/71 |
| 4,180,539 | 12/1979 | Clarke | 264/143 |
| 4,632,752 | 12/1986 | Hunke | 425/71 |
| 5,146,822 | 9/1992 | Noda et al. | 425/71 |

FOREIGN PATENT DOCUMENTS

| | | |
|---|---|---|
| 0126459 | 11/1984 | European Pat. Off. . |
| 0406535 | 1/1991 | European Pat. Off. . |
| 1557367 | 2/1969 | France . |
| 2627263 | 12/1977 | Germany . |
| 3105609 | 8/1982 | Germany . |
| 3941392 | 6/1991 | Germany . |
| 61-162305 | 7/1986 | Japan . |
| 099011 | 9/1977 | Taiwan . |
| 103180 | 9/1988 | Taiwan . |

Primary Examiner—Jay H. Woo
Assistant Examiner—Joseph Leyson
Attorney, Agent, or Firm—Banner & Allegretti, Ltd.

[57] ABSTRACT

A device for cooling, granulating and drying molten strands of synthetic thermoplastic material emerging from dies includes a cooling unit for applying a cooling liquid to the strands and a granulator housing with a cutting roll for granulating the strands. The granulator housing is connected to an outlet duct with a sieve to separate the thermoplastic material from the cooling liquid. The sieve is arranged so that the granules separated from the strands by the cutting roll impinge directly on the sieve at basically the same speed as that imparted to the granules by the cutting roll.

8 Claims, 2 Drawing Sheets

DEVICE FOR COOLING, GRANULATING AND DRYING MOLTEN STRANDS OF SYNTHETIC THERMOPLASTIC MATERIAL EMERGING FROM DIES

BACKGROUND AND SUMMARY OF THE INVENTION

The invention relates to a device for cooling, granulating and drying molten strands of synthetic thermoplastic material emerging from dies with a cooling unit which feeds strands into a bath of cooling liquid and to which is connected a granulator housing, which contains a cutting roll and to which is connected an outlet duct with a sieve to separate the thermoplastic material from the cooling liquid.

Such a device is known from the DE-PS 26 27 263. In this device the cooling unit comprises a discharge channel, whose upper end is supplied with cooling water and whose bottom end opens into a granulator housing containing a cutting roll. An outlet duct is attached to the granulator housing, and in particular in the horizontal direction, since the granulator housing deflects, owing to a rounded rear wall, the granules which are cut from the strands by the cutting roll. The granules leave the housing essentially in horizontal direction, a feature that is facilitated by a cooling water feeder provided in the housing close to the cutting point of the cutting roll. The cooling water floods the granules that have been cut off along the rounded rear wall of the granulator housing in the horizontal direction beyond a sieve arranged in the bottom of the horizontal outlet duct, where the water accompanying the granulate is drawn off in part by the sieve as a consequence of gravity. The intensity of this water separation is relatively low, since, as stated, only gravity acting on the water is utilized for this purpose. The result is that the granulate leaving the outlet duct still exhibits a high degree of surface moisture.

The invention is based on the problem of increasing the degree of drying of the granulate which has been separated by means of a cutting roll from wet or moist strands, and at the same time providing a special drier that has a low energy requirement.

This problem is solved by The invention by arranging the sieve in such a manner that the granules separated from the strands by the cutting roll impinge directly on the sieve at essentially the same speed as that imparted to the granules by the cutting roll.

The invention exploits the significant amount of kinetic energy that is transferred from the high speed cutting roll to the granules, in order to spin the water from the granules. The granules are namely cut by the individual knives of the cutting roll and thrown approximately tangentially from the cutting roll. The results for the granules are speeds in the order of magnitude of 10 m per second. If a granule impinges at such a speed on a sieve, water clinging to the granule is thrown almost completely from it, whereby the water passes through the sieve and thus can be extracted. To achieve this goal, the sieve is arranged in such a manner that the granules separated from the strands by the cutting roll impinge directly on the sieve without any intermediate deflection or point of impact.

The kinetic energy imparted to the granules is automatically generated owing to the necessary drive to the cutting roll, so that to accelerate the granules to virtually the circumferential speed of the cutting roll no additional energy is required.

Expediently the sieve is arranged at such an angle with respect to the direction of impingement of the granules that said granules impinge in the direction of a sieve that follows. In this case another sieve is utilized to throw the residual water from the granulate, since in this case the granules impinge on a sieve twice in succession. This serial connection of the sieves can be provided also multiple times.

It is also possible to design at least one of the sieves as a curved sieve, as shown, e.g. in the DE-PS 31 05 609. This curved sieve can be arranged in such a manner that granules either impinge obliquely on it or are fed tangentially to the curved sieve.

To extract the cooling liquid which may or may not cling to the sieves, a feeder for air to be blown on the sieve is assigned to at least one sieve. The air blown thus into the flow of the granulate escapes then over the sieves and drags with it any water clinging to said sieve.

The amount of water to be extracted through the sieves following the granulator can be decreased by attaching a pre-separator in front of the granulator housing. Such a pre-separator is known from the DE-PS 33 36 032. Then only a relatively small amount of residual water reaches the granulator, so that only said water has to be extracted from the sieves.

The heat intrinsic to the granules can be utilized by a well-known method to extract through evaporation the residual water from the granules. To achieve this goal, the cooling of the strands is set in such a manner that the heat intrinsic to the granules is left; and, following impingement of the granules on the sieve or sieves, said heat suffices to almost totally evaporate the water still wetting the granules.

BRIEF DESCRIPTION OF THE DRAWINGS

Embodiments of the invention are shown in the Figures.

FIG. 4 depicts a plurality of sieves attached to the granulator with inlets for air to be blown in.

DETAILED DESCRIPTION OF THE PREFERRED EMBODIMENTS

Figure 1:
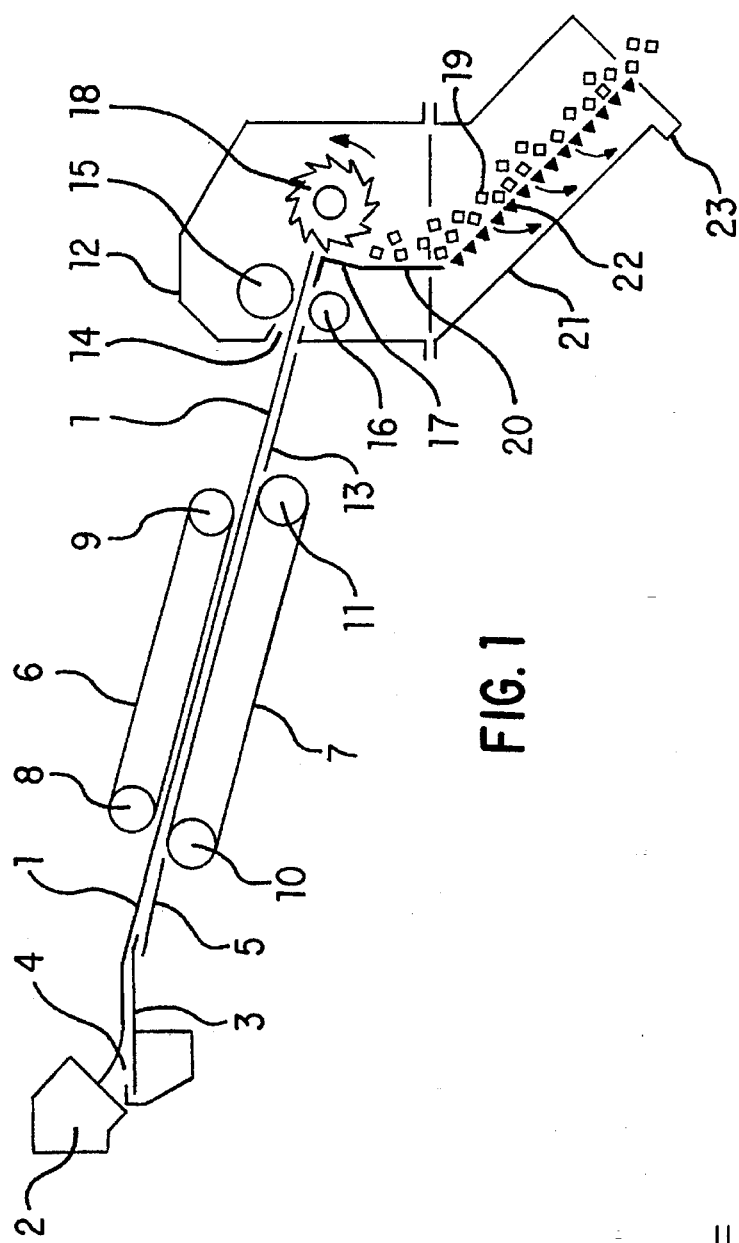
FIG. 1 depicts M device with a sieve attached to the granulator and a cooling unit comprising conveyor belts.

FIG. 1 is a diagrammatic, simplified view of a device for cooling, granulating and drying molten strands 1 emerging from dies of the die head 2. The strands 1 are intercepted by the feed unit 3, whose left end is provided with an overflow 4 for the entry of cooling water, which flows off by way of the feed unit 3 and thus carries along the strands 1. Then the feed unit 3 feeds the strands 1 by way of a metal guide plate 5 to a pair of conveyor belts 6 and 7, which convey the strands 1 in such a manner by means of deflecting rollers 8, 9, or 10, 11 that the parallel members of the conveyor belts 6 and 7 cause the strands to be fed in the direction of the granulator housing 12. Behind the outlet of the two conveyor belts 6 and 7 in the region between the deflecting rollers 9 and 10 there is another metal guide plate 13, which feeds the strands 1 to the inlet 14 of the granulator housing 12. The cooling water delivered by the feed unit 3 flows within this cooling unit over the metal guide plate 5, between the two conveyor belts 6 and 7 and off by way of the metal guide plate 13, thus cooling the strands 1 and flowing into the inlet 14 of the granulator housing 12.

The strands 1 are grasped by both feed rolls 15 and 16 directly behind the inlet 14 of the granulator housing 12 and fed at a defined rate of advance over the stationary knife 17 of the cutting roll 18. The cutting roll 18 rotates in the direction of the drawn arrow at a high speed, e.g. 1,000 rpm. The individual knives of the cutting roll 18 cut in accordance with the rate of advance of the strands i correspondingly long granules 19 from the strands 1, which are spun away from the cutting roll 18 at the same speed owing to the relatively high circumferential speed of the cutting roll 18. At the same time the granules 19 are thrown approximately tangentially from the cutting roll 18 and in particular according to the drawn arrow at a more or less large angle away from the support 20 of the stationary knife 17.

The outlet duct 21, which contains the sieve 22, is flanged to the granulator housing 12. The sieve 22 projects at such an angle within outlet duct 21 so far in the direction of the granulator housing 12 that the granules 19 impinge directly on the sieve 22 from the cutting roll 18. The kinetic energy imparted to the granules 19 by the cutting roll 18 is utilized extensively for the granules 19 to impinge on the sieve 22, so that water adhering to the granules 19 is almost totally spun off from it. Then the water can flow off through the sieve 22 in accordance with the drawn curved arrows and flows off down inside the outlet duct 21 and through the discharge pipe 23.

The device described above employs without additional energy a special drier, namely the sieve 22, whereby the kinetic energy automatically imparted to the granules 19 by the cutting roll 18 is totally exploited for the drying process.

Figure 2:
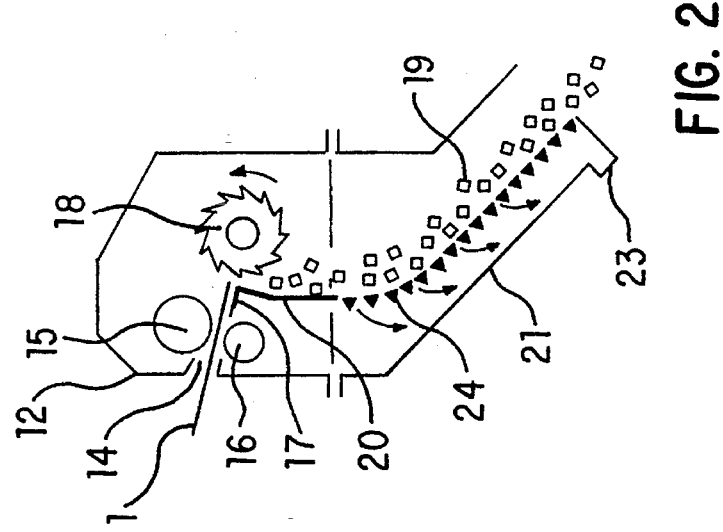
FIG. 2 depicts the design of the sieve attached to the granulator as a curved sieve.

FIG. 2 shows a modification of the device according to FIG. 1, where the issue is the design of the sieve, which is designed here as a curved sieve 24. In this case the granules 10 impinge at a very obtuse angle or almost tangentially on the curved sieve 24, whereby, as in the case of the device according to FIG. 1, first the water adhering to the granules 19 is largely thrown off by the impact. As the granules 19 continue their flight, they migrate over the curve of the curved sieve 24, where owing to this guide centrifugal force is exerted on the granules 19 and thus on the water adhering to said granules and the centrifugal force is also exploited to spin off the residual water.

Figure 3:
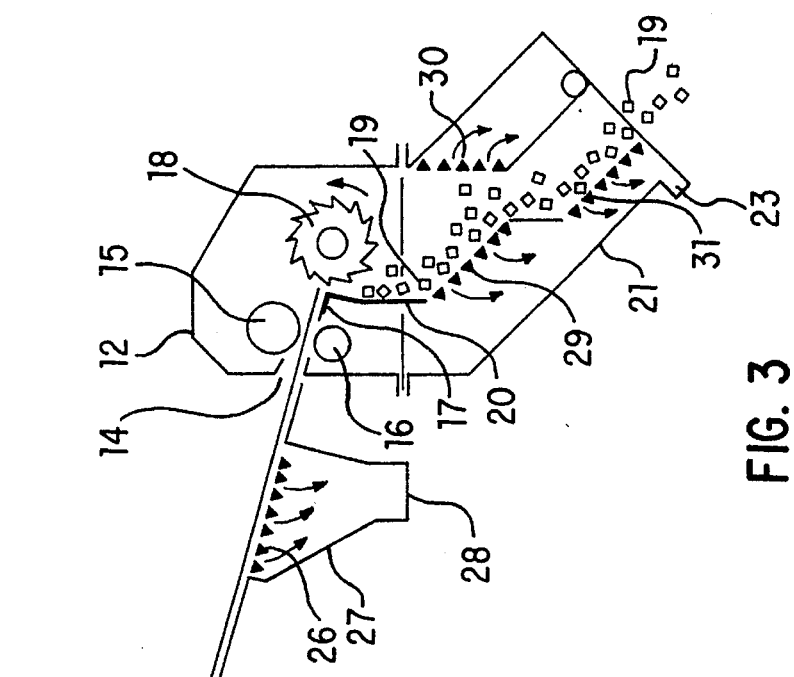
FIG. 3 depicts the device with two sieves connected in succession and a discharge channel as the cooling unit.

FIG. 3 shows another modification of the device with respect to FIG. 1, in which the cooling unit comprises in essence a discharge channel 25, which is fed by the feed unit 3 the cooling water coming from the overflow 4. The pre-separator sieve 26, which acts as an outlet, is installed into the discharge channel 25; said pre-separator sieve is used when the cooling segment specified by the discharge channel 25 provides adequate cooling for the strands 1, so that the cooling water can be extracted largely before the granulator housing 12. Thus, the cooling water flows through the sieve 26 into the discharge funnel 27 and from there is discharged through the neck 28. This pre-separation of the cooling water at the end of the discharge channel 25 facilitates the drying of the granules 19 following cutting by means of the cutting roll 18.

As in the case of the device according to FIG. 1, the granules 19 impinge here on the sieve 29, which is arranged in a manner analogous to that of the sieve 22 in FIG. 1. Another sieve 30 is arranged close by opposite sieve 29, so that granules 19 bouncing off the sieve 29 impinge then on the sieve 30. Thus residual water can be thrown from the granules once again at the sieve 30. The granules 19 falling off the sieve 30 impinge then on the third sieve 31, which is provided in the outlet duct 21 and over which they then trickle down to a certain extent, whereby once again any existing residual water can be separated off.

Figure 4:
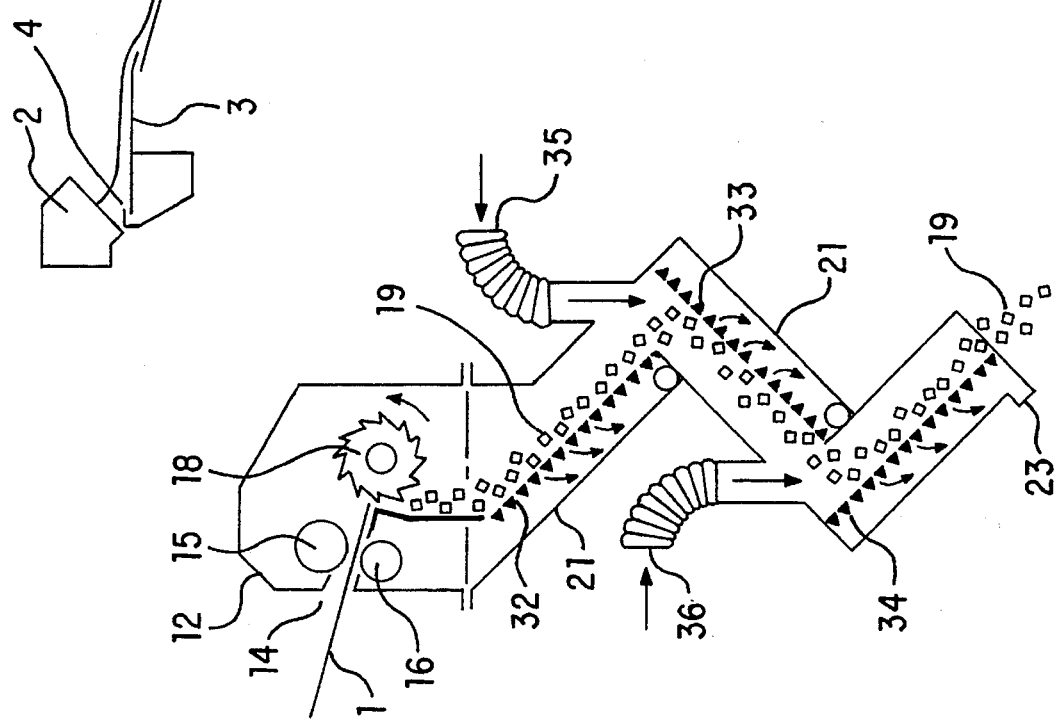

FIG. 4 depicts an embodiment in which first, as with the embodiment according to FIG. 1, there is a sieve 32, which serves for the granules 19 to impinge on and to which are attached two other sieves 33 and 34 in a zig-zig arrangement for the granules 19 to trickle down. To extract water, which adheres in particular to the sieves 33 and 34 and which could prevent water from passing continuously, the two air feeders 35 and 36 are provided through which an air current is blown on the sieve 33 or sieve 34. The danger of water adhering to the sieves is thus less at the sieve 32, because the granules 19 impinge on the sieve 32 at a relatively high kinetic energy. The air blown in through the air feeders 35 and 36 into the outlet duct 21 passes to a significant degree through the sieves 33 and 34 and in so doing takes the water adhering to said sieve with it.

It must also be pointed out that varying cooling units can be attached in front of the granulator housing 12, thus not only the conveyor belts 6 and 7 or the discharge channel 25. It is also possible, e.g. to connect a water bath guiding the strands to be cooled in front of the granulator housing. In addition, by the term "sieve" is understood all designs in which a metal plate or the like is provided with a plurality of passages of such a size that the cooling water, but not the granulate, can pass, e.g. thus a perforated plate or a bar sieve.

I claim:

1. A device for cooling, granulating and drying molten strands (1) of synthetic thermoplastic material emerging from dies which comprises a cooling unit (6, 7; 25) for applying a cooling liquid onto the strands, a granulator housing (12) which is connected to said cooling unit and contains a cutting roll (18) for receiving and granulating the strands and ejecting granules along a path, and an outlet duct (21) which is connected to said granulator housing and provided with a sieve (22, 24, 29, 32) to separate the thermoplastic material from the cooling liquid, wherein the sieve (22, 24, 29, 32) is positioned in the path along which the granules (19) are ejected by the cutting roll (18) so that all the granules impinge directly on the sieve (22; 24; 29; 32) at essentially the same speed as the speed imparted to the granules (19) by the cutting roll (18), by which said speed throws the cooling liquid almost completely from the granules.

2. A device as claimed in claim 1, wherein the outlet duct is provided with a second sieve, and wherein the first mentioned sieve (22, 24, 29, 32) is arranged at such an angle with respect to the direction of impingement such that said granules bounce from said first mentioned sieve and impinge said second sieve (30).

3. A device as claimed in claim 1, further comprising a series of additional sieves (29, 30, 31; 32, 33, 34) arranged after the first mentioned sieve so that the granules successively impinge said series of sieves.

4. A device as claimed in claim 1, wherein the sieve is designed as a curved sieve (24).

5. A device as claimed in claim 1, further comprising a feeder (35; 36) for air to be blown on the sieve.

6. A device as claimed in any one of claims 1 to 5, further comprising a preseparator (26) between said cooling unit and said granulator housing for removing a portion of the cooling liquid from the strands.

7. A device as claimed in either of claims 2 or 3, wherein at least one of the sieves is designed as a curved sieve.

8. A device as claimed in either of claims 2 or 3, further comprising a feeder for air to be blown on at least one sieve.

* * * * *